United States Patent [19]

Janes et al.

[11] Patent Number: 5,333,527
[45] Date of Patent: Aug. 2, 1994

[54] COMPRESSION MOLDED COMPOSITE GUITAR SOUNDBOARD

[76] Inventors: Richard Janes, 11730 N. 91st Pl., Scottsdale, Ariz. 85260; William R. Cumpiano, 31 Campus Plaza Rd., Hadley, Mass. 01035

[21] Appl. No.: 28,725

[22] Filed: Mar. 8, 1993

Related U.S. Application Data

[63] Continuation of Ser. No. 749,599, Aug. 26, 1991, abandoned.

[51] Int. Cl.$^5$ .............. B29C 43/18; B29C 67/14; G10D 1/02; G10D 1/08
[52] U.S. Cl. .................... 84/291; 84/452 P; 84/192; 84/193; 264/257; 156/245; 156/330
[58] Field of Search .................... 84/192–196, 84/191, 291, 267, 452 R, 452 P; 264/257; 156/325, 331.1, 245, 330

[56] References Cited

U.S. PATENT DOCUMENTS

| | | | |
|---|---|---|---|
| 4,348,933 | 9/1982 | Kaman et al. | 84/193 |
| 4,364,990 | 12/1982 | Haines | 84/193 |
| 4,408,516 | 10/1983 | John | 84/452 P |
| 4,836,076 | 6/1989 | Bernier | 84/291 |
| 4,846,039 | 7/1989 | Mosher | 84/452 P |
| 4,860,629 | 8/1989 | Del Giudice | 84/452 P |
| 4,873,907 | 10/1989 | Decker, Jr. et al. | 84/291 |
| 4,942,013 | 7/1990 | Palmer et al. | 264/257 |
| 4,950,437 | 8/1990 | Lieber | 264/257 |
| 4,969,381 | 11/1990 | Decker, Jr. et al. | 84/291 |
| 5,171,926 | 12/1992 | Besnainou et al. | 84/452 P |
| 5,189,235 | 2/1993 | Fishman et al. | 84/291 |
| 5,225,140 | 7/1993 | Hayashikoshi et al. | 264/257 |

*Primary Examiner*—William M. Shoop, Jr.
*Assistant Examiner*—Helen Kim

[57] ABSTRACT

An improved acoustic guitar soundboard comprising a composite sheet formed of multiple layers of epoxy impregnated graphite fibers which have been accurately preimpregnated at about 33% resin to 67% fiber, after which they are layed up in laminates of unidirectional fibers with a woven graphite fiber fabric located as both top and bottom surfaces. The fiber orientation is preferably three to four times as many fibers in the longitudinal direction as in the latitudinal direction. The layups also are always equal and opposite in layered sequence so as to eliminate uneven stress. The sheet is cured in a heated platen press at uniform pressure and temperature. The soundboard may also have either standard wood bracing, rib-like bracing or no bracing at all. The waves applied in radial orientation enhance vibration, while orienting the waves into surrounds for individual sound plates tend to create individual resonance reservoirs for specific sound frequencies. Also, the soundboard can be molded with all finished machine dimensions in place in order to reduce manufacturing costs.

4 Claims, 8 Drawing Sheets

COMPRESSION MOLDED COMPOSITE GUITAR SOUNDBOARD

This is a continuation of U.S. application Ser. No. 07/749,599 filed Aug. 26, 1991, now abandoned.

BACKGROUND OF THE INVENTION

1. Field of the Invention

This invention relates to an improved guitar soundboard and, particularly, to a compression molded composite material soundboard including a woven graphite fiber, epoxy resin matrix top lamination.

2. Summary of the Background Art

Modern wood acoustic guitars have a soundboard which consists of spruce wood to the underside of which has been glued several wooden braces. The sound quality which emanates from these guitars is presently considered desirable and the standard to which any non-wood composite soundboard is presently held.

The problems related to wooden musical instruments have historically been numerous. Wood soundboards gain and lose moisture. This phenomenon may cause undesirable changes to the intonation of the instrument, as well as threatening the durability of the instrument by weakening the structure. Another problem of wood soundboards is the degree of warpage which occurs over time due to the propensity of wood to creep when subjected to tension for long periods of time. This warpage is usually evident in the bridge area where the strings are anchored, and therefore the area where high tensions are exerted upon the wood. The luthier usually deals with this problem by adding additional bracing underneath the bridge, which can detract from the sound production emanating from the guitar.

Lastly, wood has an unpredictability which is always associated with something that nature has provided. No two pieces of wood sound the same. Since the soundboard is usually fabricated from two matched pieces of wood, even the same guitar could have mixed qualities due to the nature of wood. A luthier never knows for sure how his latest creation will sound until it is completely finished.

It has been apparent in the prior art concerning composite soundboard substitutes for wooden soundboards that the designers are trying to copy the sound of wood and, thus, they are attempting various approaches which tend to reduce the composite material to some of the same physical limitations as are found in wood. As an example, U.S. Pat. No. 4,364,990 of Haines describes a soundboard which produces a sound similar to wood by sandwiching a layer of cardboard between two layers of composite material. The stated objective is to dampen the sound vibrations which would have otherwise emanated from the composite structure. One of the drawbacks of this design is the weakness created by bonding an extremely weak material in comparison between two layers of extremely strong and stiff materials. This tends to create weak areas which can encourage delamination.

The other problem is that sound production is reduced, since the damping effect will diminish all accepted descriptions of sound production.

Another approach of similar nature is U.S. Pat. No. 4,353,862 of Kaman, in which he fabricates a soundboard for a guitar by placing a sheet of wood in a shallow mold cavity with a layer of fiberglass fabric, and proceeds to spread a layer of liquid resinous compound over the fiberglass in order to impregnate fabric. The resin is cured inside a vacuum bag. The combination of wood and fiberglass along with a wet layup of resin assures a reduction in sound production called damping.

Still another approach has been recorded by Decker, et al, in U.S. Pat. Nos. 4,873,907 and 4,969,381. The composite design of Decker consists of a combination of silk cloth for visual ornamentation, graphite unidirectional fibers are added and finally a woven fabric of aramid fiber, known for its damping qualities, is applied. The resin is applied as a wet layup and is molded without the benefit of uniform pressure application. The resultant soundboard will be lacking in uniformity of fiber spacing, as well as no uniformity of percentage of fiber to resin. Also, the resin content is extremely high, at about 50%, when compared to the percentage of fiber. This creates a soundboard which has lower resonance qualities when compared to an accurately preimpregnated fiber graphite material which has an initial percentage of resin to fiber, by weight of 33% resin to 67% fiber. The excess resin, the lack of uniform temperature and pressure application, and the use of polyester resin systems, all tend to produce a weak and nonpredictable type of soundboard, with less than optimum sound production.

As illustrated by the great number of prior patents, efforts are continuously being expended in an effort to produce acoustic guitar soundboards of improved sound, which are more efficient, reliable, inexpensive and convenient to manufacture and use.

The present invention achieves its intended purposes, objectives and advantages through an unobvious combination of component elements, with the use of a minimum number of parts, at a reasonable cost to manufacture and by employing only readily available materials.

Accordingly, it is an object of the present invention to provide an improved acoustic guitar comprising a soundboard formed of an epoxy resin impregnated graphite combination which has a predesigned percentage of epoxy resin, about 33%, impregnated into a predesigned percentage of carbon fiber, about 67%. The outer layers, upper and lower, consist of a woven cloth of graphite fiber impregnated with epoxy resin. The internal layers are epoxy empregnated unidirectional graphite fobers in which each layer is placed in the ratio of approximately three to four times as many layers in the longitudinal direction as layers in the lateral direction.

The soundboard layup is then placed in a mold, if desired, and then placed in a heated platen press where uniform temperature and pressure is applied, assuring proper resin flow and squeezeout and uniform orientation of fibers so as to eliminate the chance for either an excess or an absence of resin. The combination of careful preimpregnation of the graphite fibers with the uniform application of heat and pressure assure predictability and maximum strength for the part.

The outer lamination of woven graphite fabric assures mechanical fiber placement which helps to eliminate the usual weakness apparent in unidirectional graphite when it is used on an outer surface, i.e., its propensity to delaminate in fibrous layers when a shear force is applied. These forces may be applied by the luthier during the construction stages. The mechanical interlocking design of the woven fabric also eliminates the possibility of fiber misdirection due to molding pressures prior to the curing of the part. The woven graphite fabric also produces a distinct visual appearance not previously recognized to be desirable in a guitar soundboard. The interweaving of the fiber yields an appearance of depth to the finished surface. Finishing can be accomplished with a clear surface finish similar to the surface treatments for wood.

It is a further object of the present invention to create a soundboard of carbon fibers in an epoxy resin matrix which has improved sound characteristics as compared to wood soundboards. This sound production is not inhibited by a desire to dampen and therefore the sound of graphite fibers in a matrix of epoxy resin can be explored without bias towards wooden soundboards.

It is a further object of the present invention to compression mold a soundboard utilizing a mold shape which may incorporate soundholes, radii at edges, thin grooves for decorative trim application, as well as the elimination of subsequent machining operations in order to render the soundboard to the proper final shape prior to installation onto the side walls of the guitar.

It is a further object of the present invention to compression mold a soundboard with bracing incorporated into the resultant molded part. This allows the designer to experiment with curved rather than straight line braces, which are common with wooden bracing.

It is a further object of the present invention to compression mold a soundboard of complex curvatures in order to enhance sound production. For example, due to the ability of this material to assume complex shapes the soundboard may be rounded, raised, faceted and otherwise formed in order to create resonance zones which reverberate in sympathy with pleasing sound vibration frequencies.

It is a further object of the present invention to compression mold a soundboard with wave-like undulations which may radiate inwards from the binding edges of the soundboard towards the central area. These waves enable the soundboard to more easily vibrate as the stiffer anchoring effect of the bonding of the soundboard with the side walls is partially negated by the undulations.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The present invention is defined by the appended claims. For the purposes of the present invention, the invention may be incorporated into an improved acoustic guitar, either steel string or classical design, incorporating nylon or gut strings, with a soundboard formed of a top and bottom layer of woven graphite fabric, and subsequent interior layers of graphite, either unidirectional fiber orientation or similar woven fabric. The fiber orientation is in a ratio of three to four times as many fibers in the longitudinal direction than in the lateral direction. The layup is cured in a heated platen press to insure uniform temperature and pressure of approximately fifty to one hundred pounds per square inch or greater. The curing of the soundboard may be performed in a mold, which will define its shape, or may be cured as a flat sheet, which can later be machined to the desired dimensions. In addition, the surface of the woven graphite fabric may be inhanced with clear gel-coat resin, or simply finished with a suitable clear coat paint.

The mold may be designed with wave-like undulations emanating from the edges towards the center, as well as raised facets incorporating waves as defining edges, so as to isolate a certain flat plate with its own specific natural frequency which can vibrate in symphathy more vigorously with certain frequencies either identical with its own, or of higher or lower harmonic register with its own natural frequency.

Lastly, the invention may be incorporated into an entire guitar if desired by compression molding the back and sides of the guitar body in the same manner as the soundboard.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

DESCRIPTION OF THE DRAWINGS

For a full understanding of the nature and objects of the invention, reference should be had to the following detailed description taken in conjunction with the accompanying drawings in which.

DETAILED DESCRIPTION OF THE INVENTION

Figure 1:
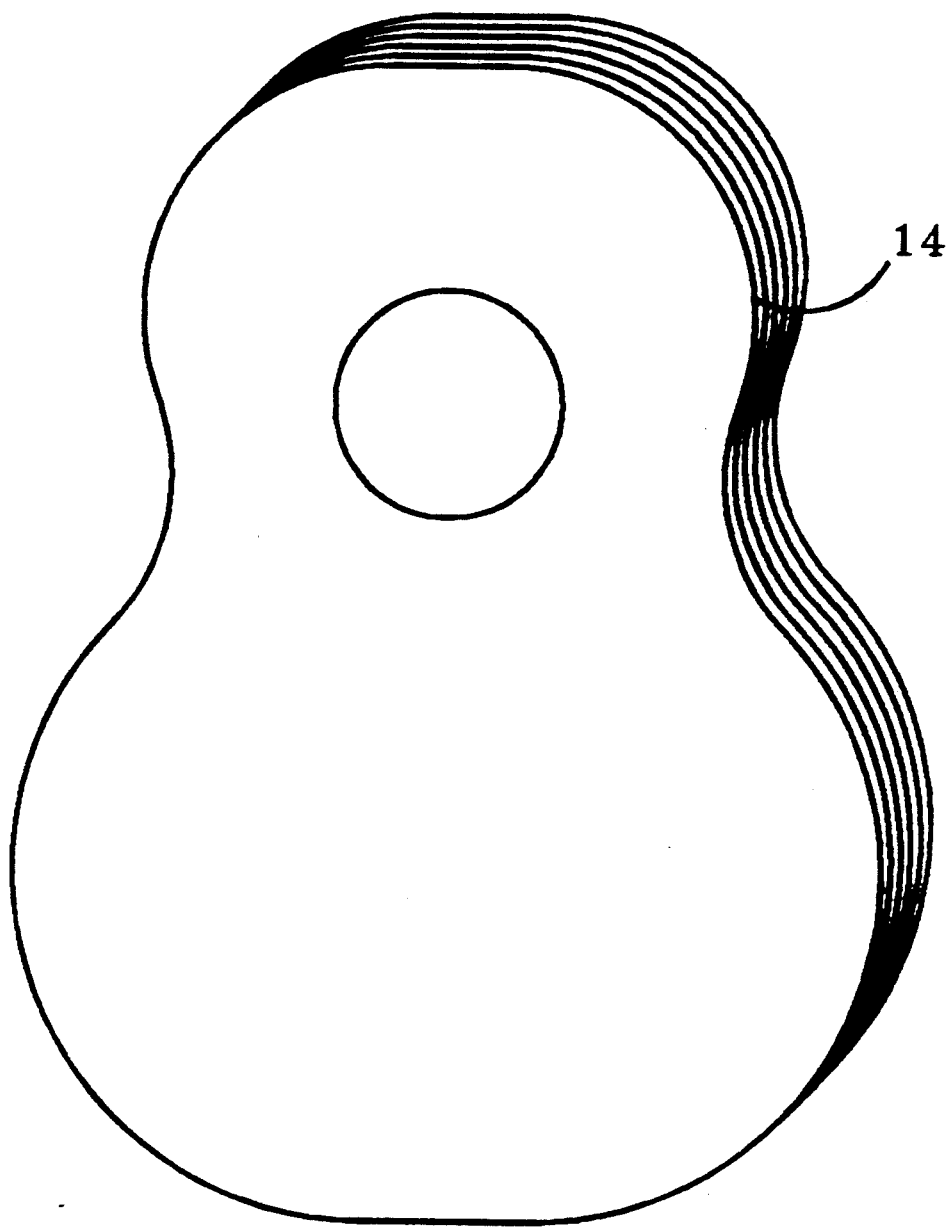
FIG. 1 is a isometric view of a guitar soundboard attached to a guitar.
Figure 2:
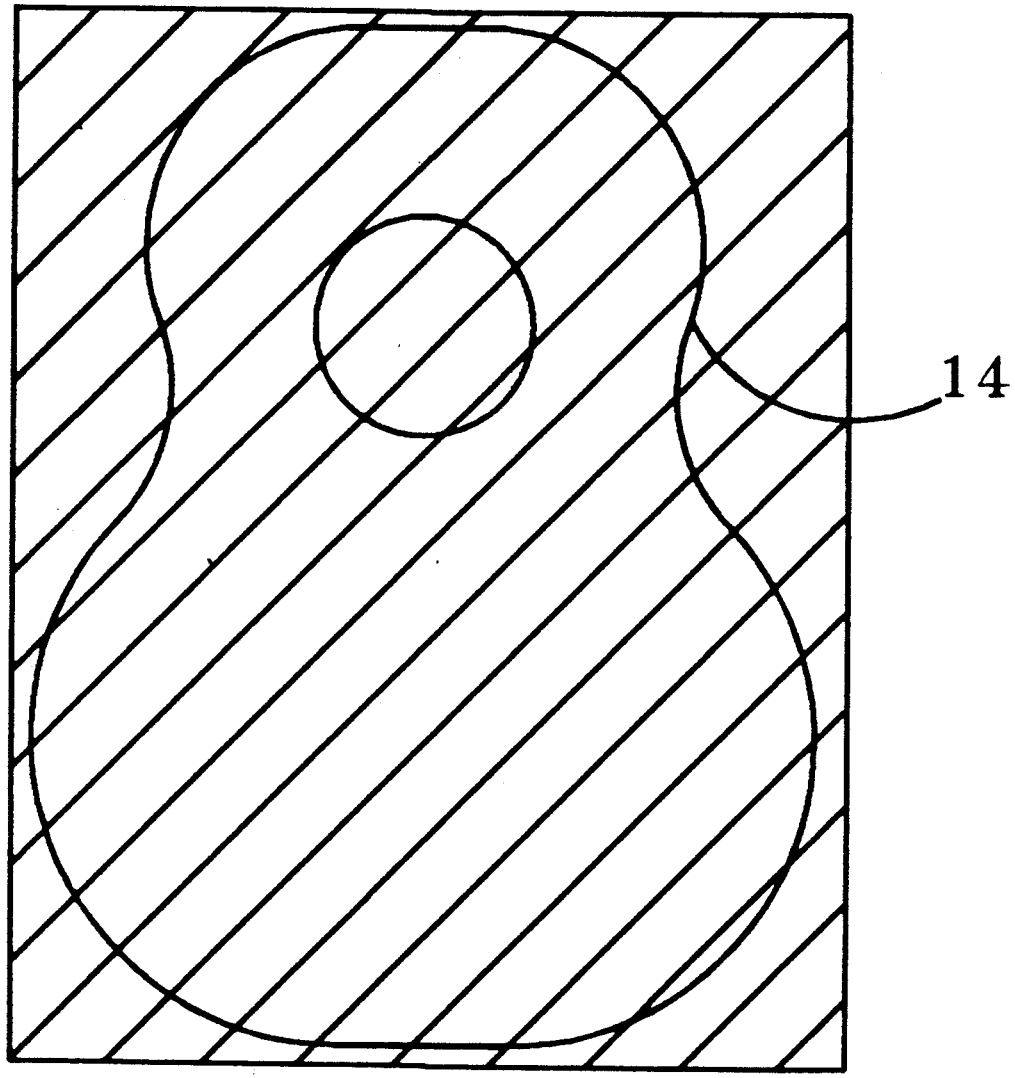
FIG. 2 is a face view of an outline of a guitar shape superimposed onto a drawing of a graphite soundboard in accordance with the principles of the present invention.
Figure 3:
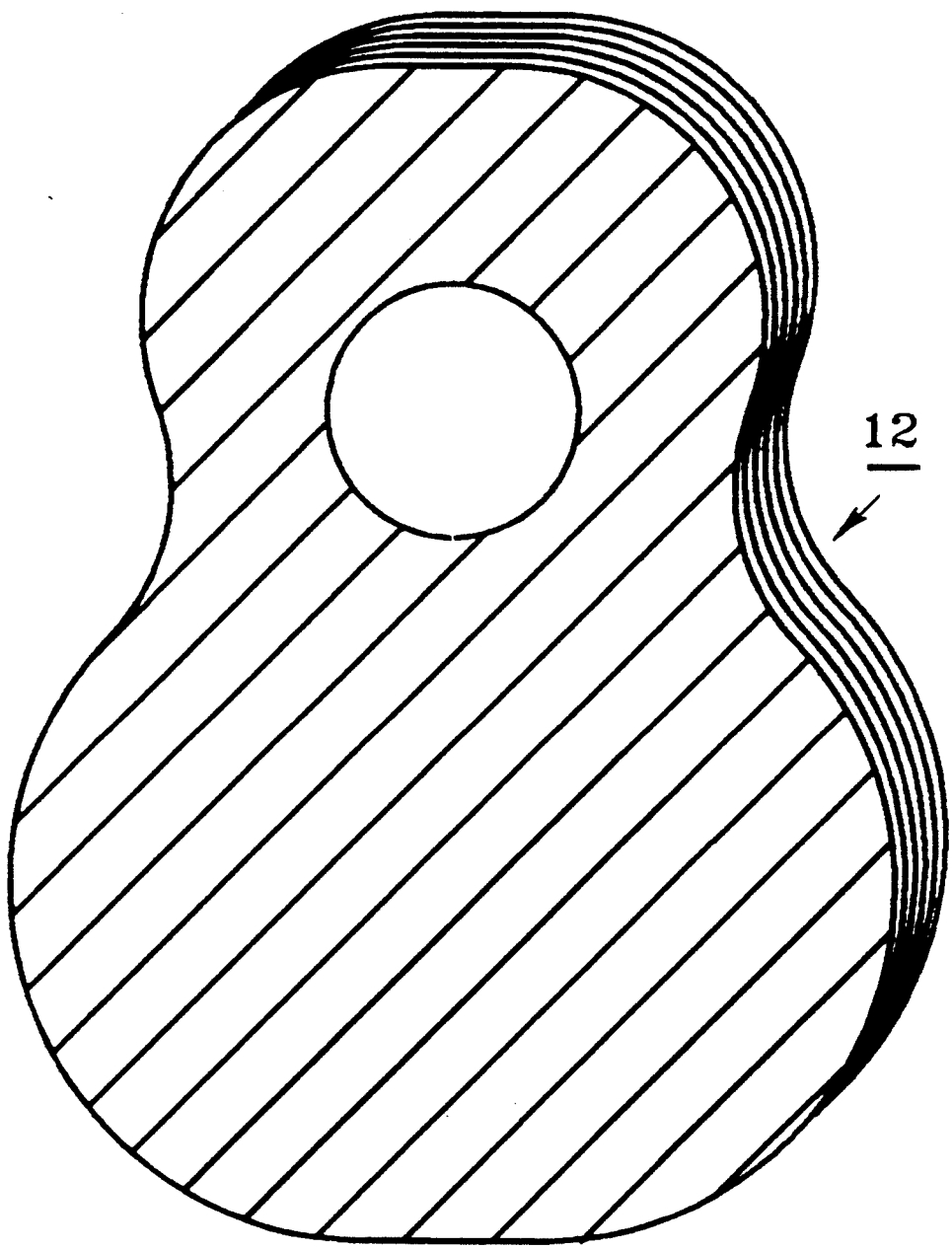
FIG. 3 is a perspective view of a guitar body with a graphite soundboard in accordance with the principles of the present invention.
Figure 4:
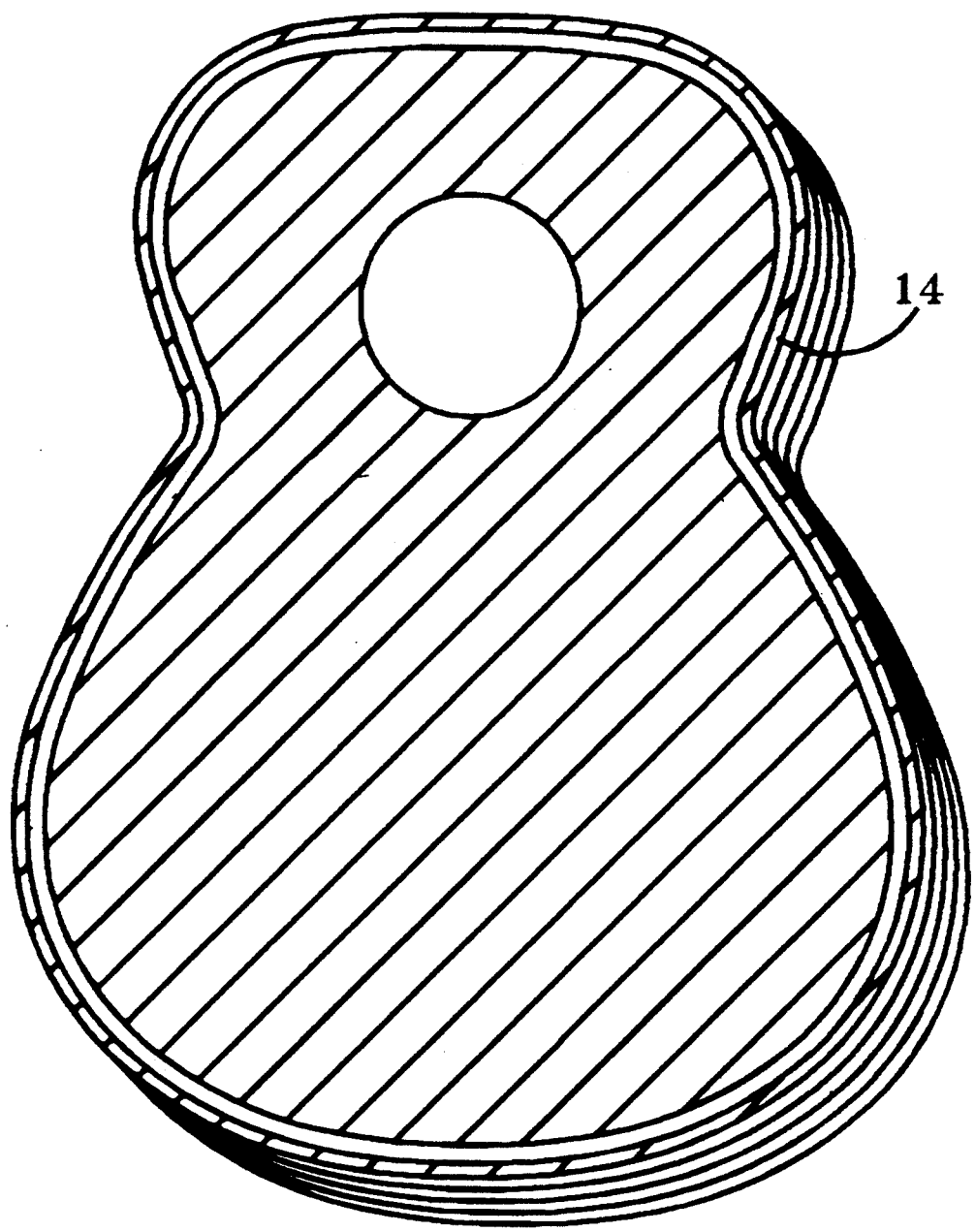
FIG. 4 is a perspective view of a soundboard incorporating waves.
Figure 5:
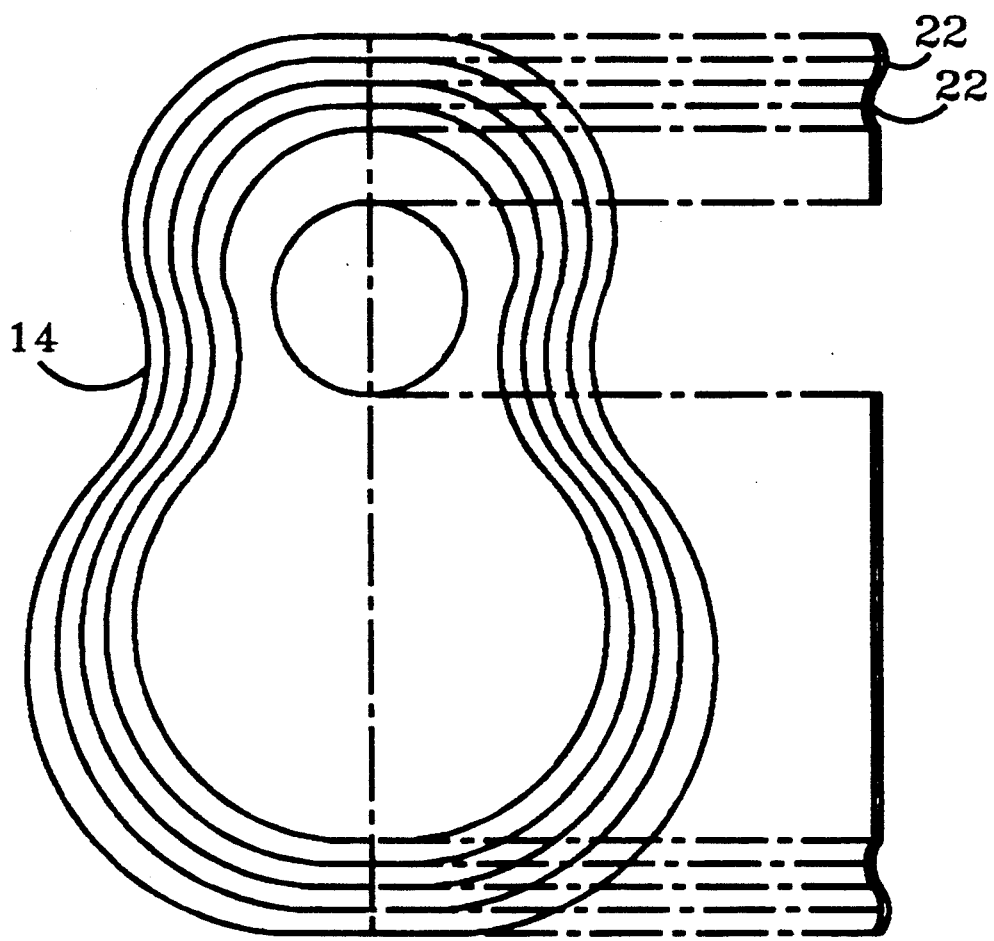
FIG. 5 is a side view of the soundboard shown in FIG. 4, in which the wave shape is more evident.
Figure 6:
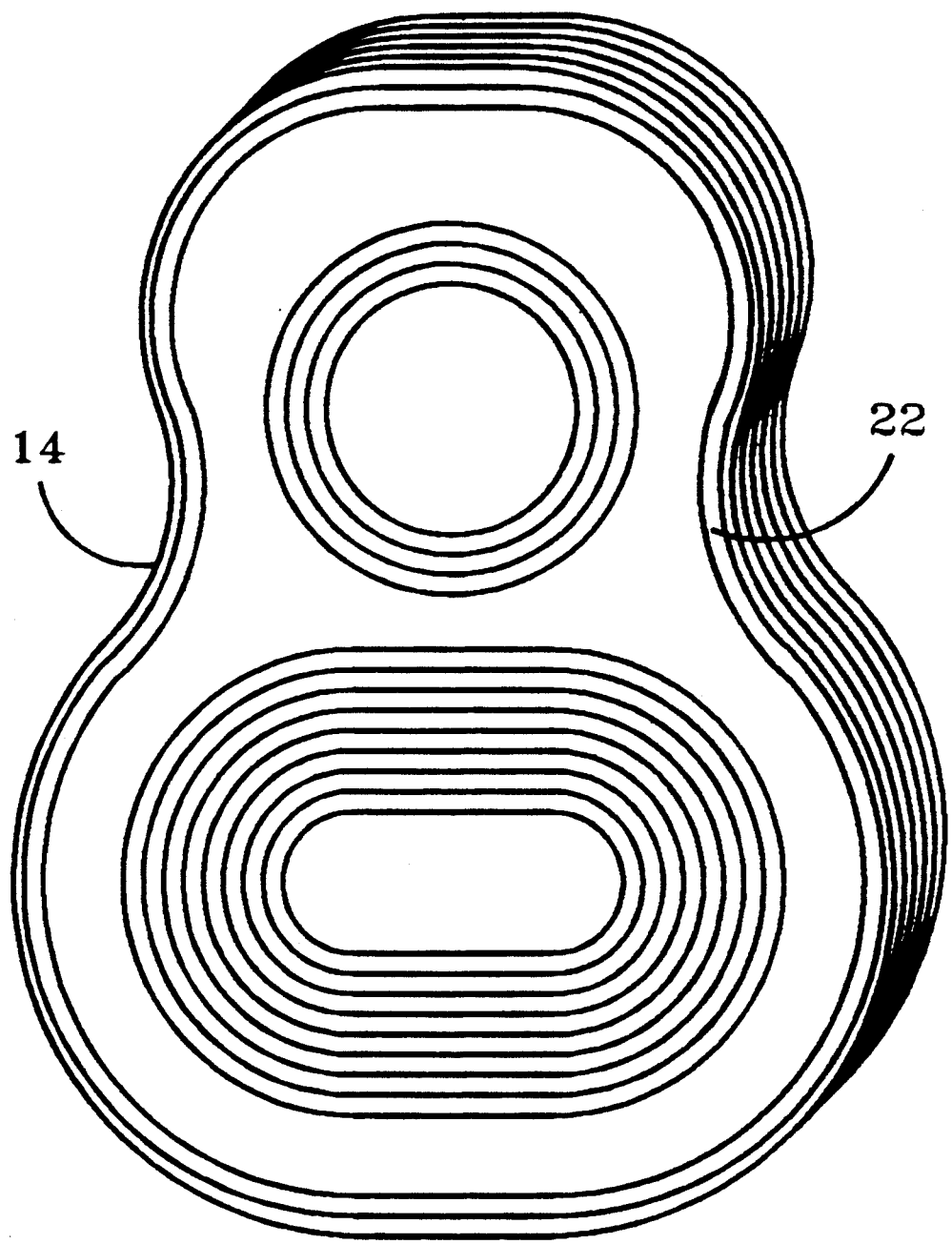
FIG. 6 is a perspective view of a proposed soundboard incorporating even more waves.
Figure 7:
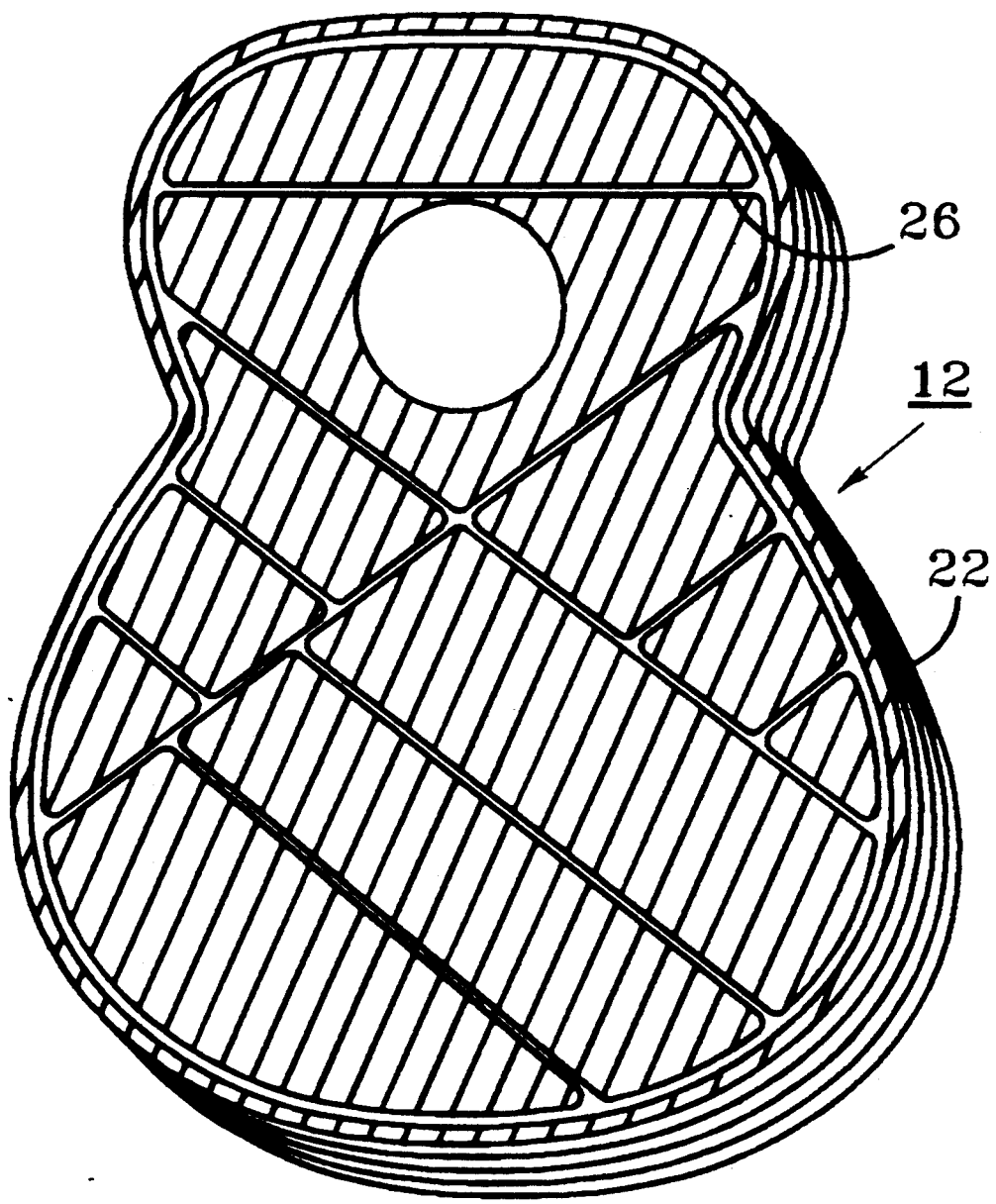
FIG. 7 is a perspective view of a guitar incorporating raised facets which act to isolate certain sound frequencies in sympathetic resonance.
Figure 8:
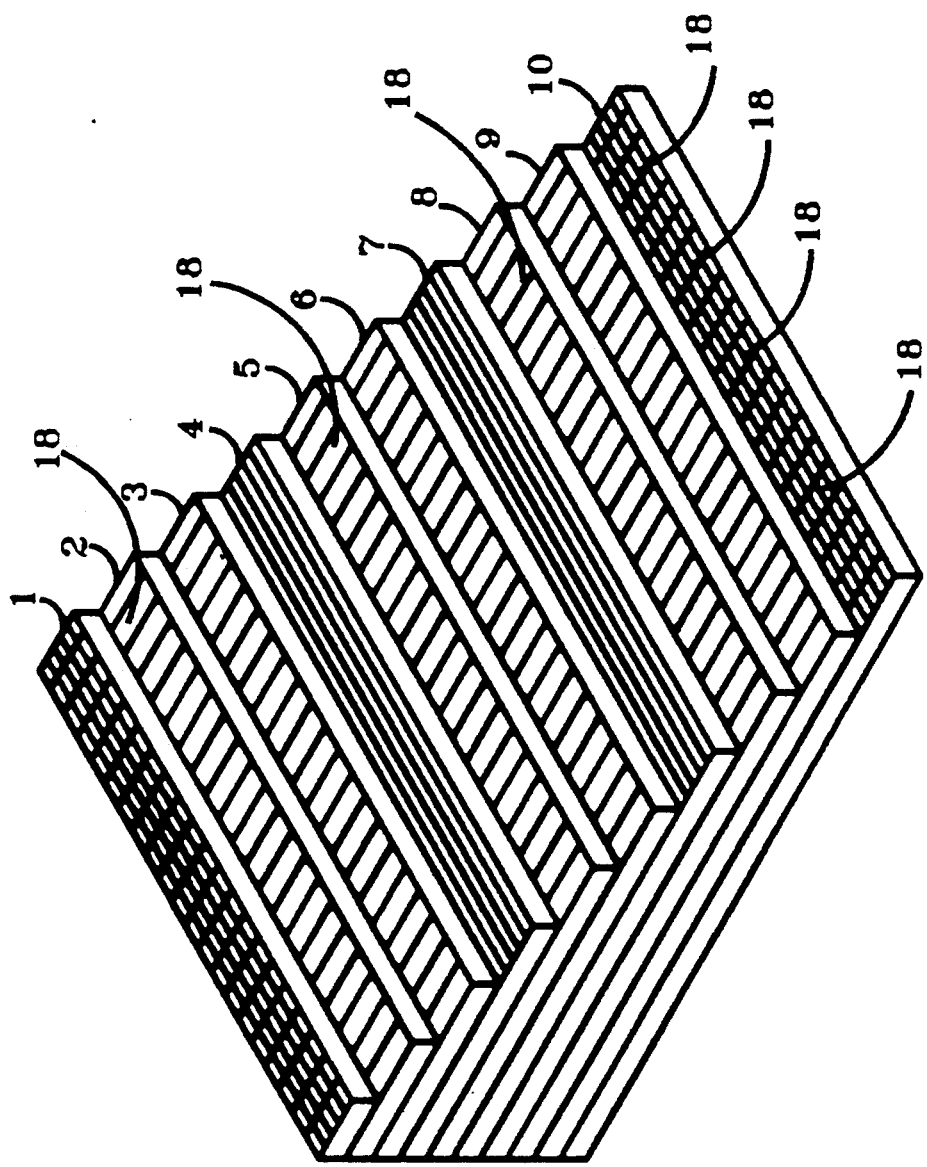
FIG. 8 is a schematic drawing of a preferred embodiment layup for a steel string guitar, in accordance with the principles of the present invention. The numbered layers are: 1 is a woven graphite fabric, 2,3,5,6,8, and 9 are zero degree unidirectional graphite tape, 4 and 7 are ninety degree unidirectional graphite tape, and 10 is a woven graphite fabric.

The present invention is defined by the appended claims. For the purposes of the present invention, the invention may be incorporated into an improved guitar 12 comprising a graphite soundboard 14 of compression molded epoxy impregnated graphite fibers with a ratio by weight of approximately 67% graphite fibers to 33% epoxy resin in multiple laminated layers 1,2,3,4,5,6,7,8,9 and 10 of unidirectional graphite 18 in an orientation of three to four times as many layers 2,3,5,6,8 and 9 located in the longitudinal direction as in the latitudinal direction. Woven layers 1 and 10 are at the top and bottom of the laminate with the unidirectional layers therebetween.

For example, one preferred embodiment for a steel string guitar is comprised of Newport Adhesive & Composites NCT-301-G150, unidirectional graphite prepreg tape and NB-301-3K70P carbon fabric (F). The layup has 10 plies, (F/0/0/90/0/0/90/0/0/F) with the "0" degree fibers parallel to the longitudinal direction of the laminate, and the warp of the fabric (F) parallel to the longitudinal direction. The layup was cured at approximately 50 psi in a preheated 300 degree F. platen press for 30 minutes.

The designation for the unidirectional prepreg tape, NCT-301-G150, describes a product utilizing Newport's NC-301 toughened epoxy resin impregnated onto a PAN based graphite fiber with a 34 MSI tensile modulus and a 550 KSI tensile strength. The FAW or fiber areal weight of the tape was 150 g/sq.m and contained 33% epoxy resin by weight.

The designation for the fabric prepreg, NB-301-BK70P describes the same resin system impregnated onto a 3K (3000 filament) PAN fiber, plain weave cloth, 1 and 10 with a 5.7 oz/sq.yd weight, 12.5 warp × 12.5 fill fabric from Katema Weavers (also available from BGF Industries, and others). The fiber is similar to those used in the unidirectional above.

The graphite soundboard 14 may be cured as a flat sheet which must then be machined to size in order to be fitted to the guitar, or it may be molded by placing the layup similar to the above mentioned layup, into a mold in order to have the soundboard conform to a final specific shape. The mold containing the graphite prepreg layup is then placed into a heated platen press and the curing operation is carried out under uniform pressure and uniform temperature which is quickly and accurately transferred to the graphite via conduction.

The soundboard 14 may be molded with one or several waves 22 formed in the graphite sheet. These waves, which originate generally from the edges of the soundboard near where the soundboard is joined to the guitar side walls. The wave geometry causes a hinge effect at the soundboard edge and allows the board to more freely vibrate when excited by the vibrating strings.

The soundboard may also have waves 24 surrounding flat areas of varying sizes and shapes. This isolates the flat areas and clearly defines a certain size flat area which will then attain its own natural frequency of vibration. In this way, a guitar may have key flat areas which vibrate vigorously at specific sound frequencies as they are excited to sympathetic vibration. These flat areas will also be excited at higher and lower frequencies when they are harmonics of the primary frequency.

The soundboard may be molded with rib-like indentations 26 which act as stiffening additions similar to the addition of braces to the underside of the soundboard. It is widely known that rib-like indentations will stiffen a flat sheet such as a sheet metal body panel of a truck. This lessens the need for bracing.

The soundboard may also have additional bracing 28 added easily. These braces may be wood or graphite, and may be bonded to the underside of the soundboard with the use of a suitable epoxy adhesive.

The soundboard may also have fiber orientation in equal ratios in all possible directions. The composite material is not of marginal strength as is wood, so that the placement direction of the fibers is not as important to the overall durability of the soundboard.

Due to the specific manner in which each layer is added to the precured soundboard, it is sometimes desirable to end certain layers of graphite before reaching the entire surface of the soundboard. Specifically, it is sometimes desirable to end some layers shortly before reaching the edge of the soundboard so as to enable the soundboard to offer less resistance, and thus more freely vibrate and not be so efficiently anchored by the sides of the guitar.

It is also, conversely, quite easy to add more laminates in specific areas in order to add stiffness and strength. An important area such as described is the area directly under the bridge. By adding additional small laminates in this area before curing the layup, increased stiffness and strength may be added.

Although graphite exhibits excellent vibration characteristics due to its extremely high ratio of strength to weight, as well as its relative equality of tensile strength to compressive strength, it may be advisable in certain cases to substitute other elements in place of graphite, such as silicon carbide fibers, and filaments of boron plated tungsten. These materials tend to propagate vibrations, without damping to any great extent.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention, it should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

Now that the invention has been described, it is claimed:

1. A guitar soundboard comprising:
    a compression molded layup of layers, each layer containing graphite fibers impregnated with epoxy resin in a ratio which is approximately 33% resin to 67% fiber by weight with the layup of graphite fiber orientation being approximately three to four times as many fibers in the longitudinal direction as in the latitudinal direction, the layup including spaced layers consisting of woven graphite fabric, the layers between the spaced layers consisting of unidirectional graphite tape, and with the layup being cured in a compression molding operation at uniform temperature and pressure, the soundboard having raised portions forming waves molded into the molded layup for improved sound capabilities.

2. The soundboard as set forth in claim 1, wherein the soundboard has peripheral edges with the raised portions forming radial waves molded into the soundboard, beginning near and parallel with the peripheral edges of the soundboard, to allow the soundboard to freely vibrate when excited by the vibrating strings of a guitar, the peripheral edges being capable of being joined with the sidewalls of a guitar body.

3. The soundboard as set forth in claim 1, wherein the raised portions are formed as waves placed in the layup at locations inwardly of the periphery of the soundboard so as to form isolated sound plates which are designed to resonate at the same frequencies as specific vibration frequencies produced by strings of a guitar.

4. A guitar soundboard comprising:
a compression molded layup of layers, each layer containing graphite fibers impregnated with epoxy resin, the layup including spaced layers consisting of woven graphite fabric, the layers between the spaced layers consisting of unidirectional graphite tape, and with the layup being cured in a compression molding operation at uniform temperature and pressure, the soundboard having peripheral edges with raised regions constituting waves formed into the soundboard, the raised regions including first waves spaced from and parallel with the peripheral edges of the soundboard forming zones for improving vibrational capabilities of the soundboard when excited by the vibrating strings of a guitar, the raised regions also including second waves formed to perform the stiffening properties normally obtained by braces, with the peripheral edges being capable of being joined with the sidewalls of the guitar body.

* * * * *